Aug. 9, 1955   R. B. JANNEY II   2,715,000
VARIABLE ASPECT RATIO CONTROL MEANS FOR PLANING
SURFACE UNITS OF AIRCRAFT LANDING GEAR
Filed July 18, 1951   2 Sheets-Sheet 1
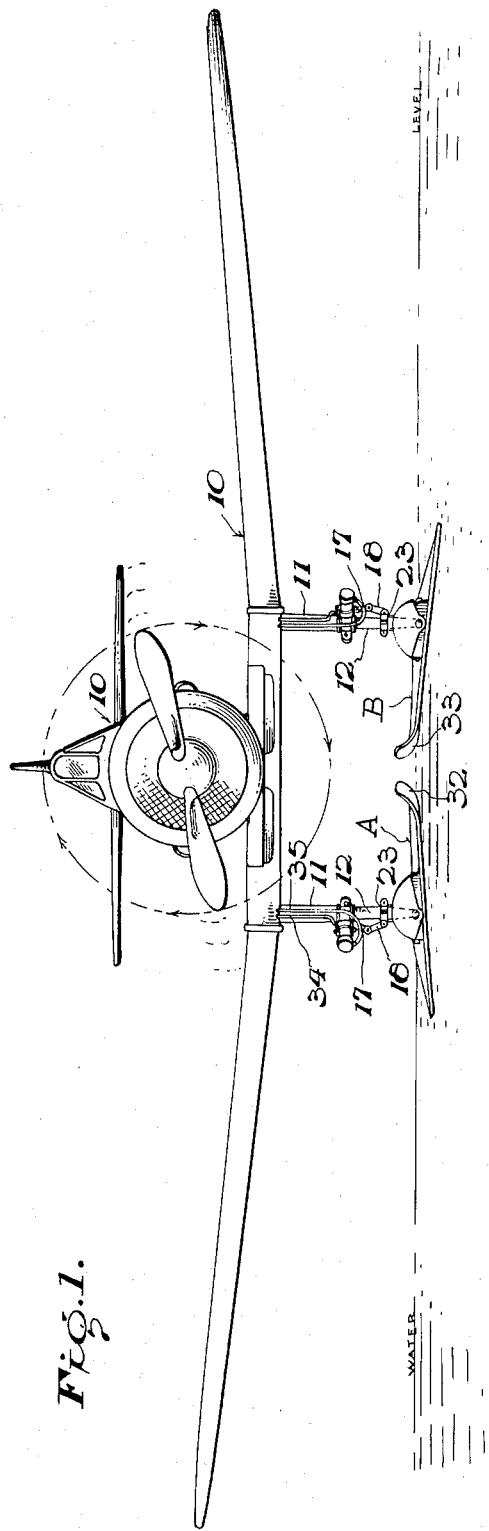
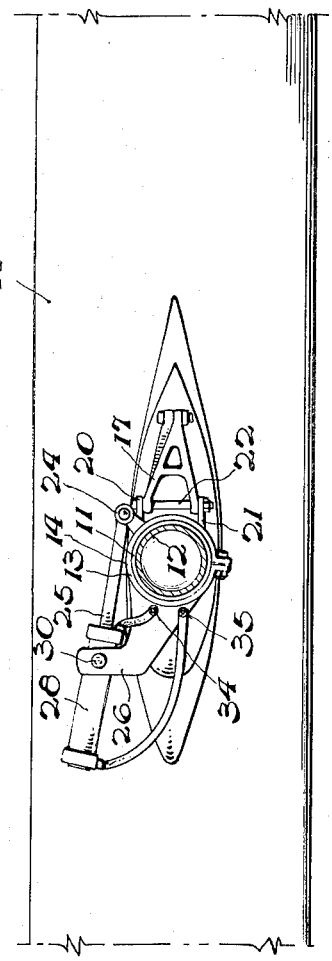
INVENTOR
*Raymond B. Janney II.*
BY *Herbert M. Birch*
ATTORNEY

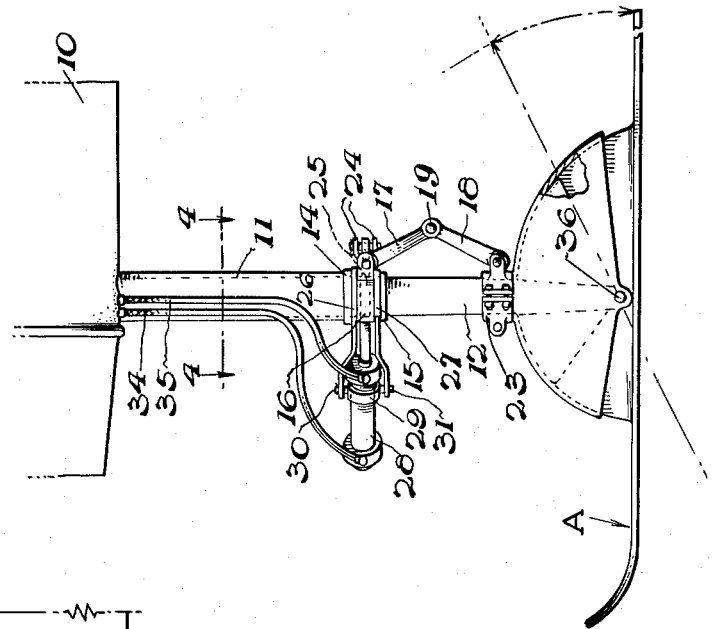
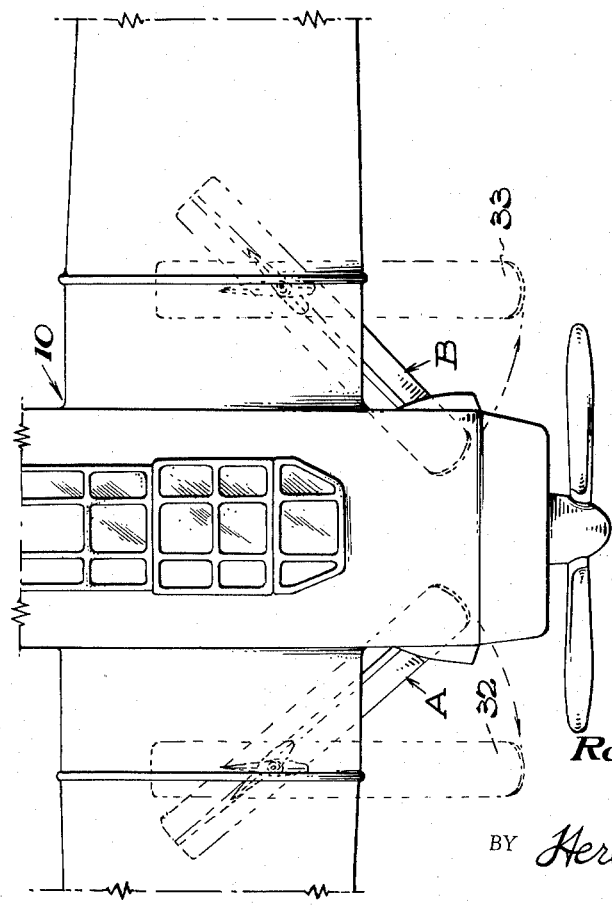

United States Patent Office 2,715,000
Patented Aug. 9, 1955

2,715,000

VARIABLE ASPECT RATIO CONTROL MEANS FOR PLANING SURFACE UNITS OF AIRCRAFT LANDING GEAR

Raymond B. Janney II, Wilmington, Del., assignor, by mesne assignments, to All American Engineering Company, Wilmington, Del., a corporation of Delaware Application July 18, 1951, Serial No. 237,331

2 Claims. (Cl. 244—108)

The present invention relates to controls for variable area planing surfaces for aircraft landing gear, such as illustrated and described in copending application Serial No. 142,654, filed February 6, 1950, now U. S. Patent No. 2,647,709 of August 4, 1953, and assigned to the assignee of this application.

The principal object of the invention is to control the dynamic lifting forces on the planing surfaces according to low and high planing speeds by varying the aspect ratio of the planing surface units.

Another object is to provide pilot controlled power means for simultaneous and coordinate angular control of the aspect ratio of each of the planing surface units.

Still another object is to provide a novel arrangement for swinging the leading edge of each of the planing surface units of an aircraft landing gear, either inboard or outboard of the vertical axis of the respective landing gear supporting struts.

The above and other objects and advantages of the invention will appear more fully hereinafter from a consideration of the detailed description which follows, taken together with the accompanying drawings wherein one embodiment of the invention is illustrated.

In the drawings wherein like reference characters refer to like parts throughout the several views:

Figure 1 is a front elevational view of an aircraft equipped with planing units and showing the same towed in or with a relatively high aspect ratio for low surface planing speeds.

Figure 2 is a top plan view of the aircraft with the wings cut-away showing the planing surfaces toed in and also in a substantially straight dotted line position for a low aspect ratio for high planing speeds.

Figure 3 is a side elevation view of one of the landing gear struts and specially mounted planing surface units with the actuating means for controlling the aspect ratio of the same, that is, the leading edge fronting ratio of the planing units with respect to the length on a longitudinal axis parallel to the thrust line of the aircraft.

Figure 4 is a transverse cross-section view taken on the line 4—4 of Figure 3.

Referring to the drawings there is shown an aircraft 10 equipped with water planing surface landing gear similar to the variable area planing surfaces described and illustrated in detail in prior pending application, Serial No. 142,654, filed February 6, 1950, and assigned to the present assignee. The planing surfaces referred to herein are hydro-ski members having an aspect ratio less than one along a longitudinal axis parallel to the thrust line of an aircraft supporting the same, which ratio may be varied by an angular change between the longitudinal and the thrust line of the aircraft from, for example, zero degrees to ninety degrees. For example, in the present application, first with reference to Figure 1, there are provided the usual shock absorbing landing gear struts formed with upper and lower telescopic sections 11 and 12, respectively. The upper section 11 telescopically houses the lower section 12, as generally well known in the art. The upper section 11 has its end suitably formed with an annular bearing surface 13 defined by two spaced apart annular flanges 14 and 15, see Figures 3 and 4. Mounted between the flanges and encircling the annular bearing surface 13 is an upper rotatable torque link coller 16, see Figure 3. The torque link is formed of upper and lower sections 17 and 18 connected by a floating pivot 19 with upper section 17 connected to the upper rotatable torque link collar 16 by spaced apertured lugs 20 and 21 and a transverse pivot shaft 22, see Figure 4; and the lower torque link section 18 is similarly connected to a second non-rotatable torque link collar 23 suitably fixed as by clamping or the like to the lower strut section 12. Radially extending from the circumference of the rotatable torque link collar 16 is a bifurcated lug 24, see Figure 3 formed with aligned openings for connecting to the free apertured end of a piston rod 25.

Laterally extending from the upper strut section 11 adjacent each side of each flange 14 and 15, respectively, are spaced apart brackets 26 and 27, see Figure 3, adapted to rockably support an actuator piston cylinder 28. The rockable support of the cylinder 28 comprises a collar 29 formed with aligned oppositely projecting pins 30 and 31, which fit in oppositely aligned openings formed in the supporting ends of the brackets 26 and 27. The bracket ends are flared to define the configuration of a yoke to better conform to the cylinder and when the piston, not shown, inside the cylinder 28 is reciprocated from a source of fluid supply to impart reciprocation to the piston rod 25, the cylinder may rock horizontally in the yoke in either direction in proportion to the amount of turn imparted to the rotatable torque link collar 16. Such turning of the rotatable collar 16 transmits power through the torque link sections 17 and 18 to the lower strut section 12, because of the connection of the lower torque link with the collar 23 fixed to said lower strut section, which is rotatable in the upper strut section 11. Such actuation of the lower strut section 12 causes the respectively connected planing surfaces A and B to be turned, so as to swing the forward or leading edges 32 and 33 thereof either inboard or outboard of their respective supporting struts, see Figure 2.

Operation

The rockably mounted cylinders 28 are suitably connected in series by a control valve arrangement with a source of fluid supply and by means of fluid conduits 34 and 35 on opposite ends of the same, so as to selectively and simultaneously supply or exhaust fluid from either side of each of the cylinder housed pistons. The fluid supply source may be from the aircraft exhaust or from an entirely independent fluid supply source, hydraulic or air, controllable by the pilot from the cabin by means of a suitable control valve.

Also, there may be provided in combination with the present planing surface aspect ratio control, a planing surface trim angle control, see pivot shaft 36, in Figure 3, such as illustrated and described in the copending application owned by the present assignee and executed on about June 15, 1951, by Donald B. Doolittle, for "Planing Surface Position Actuating Device," Serial Number 233,042.

Thus there is provided a novel control system for fronting the leading ends of the planing surface members of landing gear of the type described in the above referred to prior copending application, wherein the fronting of the leading ends or aspect ratio of the planing members is variable during high and low speed planing to control the hydrodynamic lifting force on the said members for the best results at such high and low speeds.

Without further description it is believed that the advantages of the present variable aspect ratio system for landing gear planing surfaces will be apparent from the drawing and description thereof to others skilled in the art and while only one embodiment is illustrated, it is to be expressly understood the same is not limited thereto, as various changes may be made in the design and arrangement of the parts illustrated. For a definition of the scope or limits of the invention, reference should be had to the appended claims.

What is claimed is:

1. An aircraft, a fuselage, having landing gear with water planing adaptability mounted thereon, a hydrodynamic lift control for the aircraft landing gear, said landing gear comprising strut members having a fixed portion and a rotatable end portion, said fixed portion being connected to and depending from the fuselage, a bearing surface on each of said fixed strut sections, a rotatable torque link collar around said bearing surface, a torque link having one end connected to said collar and the opposite end connected to means carried by said lower strut section, said lower strut section being rotatable in said upper section, and remotely controlled fluid ram means connected to said rotatable torque link collar for transmitting power through said torque link to rotate the lower strut section, to thereby change the angle of the longitudinal axis and the aspect ratio of each planing surface of each unit by turning the leading edges of each of the respective planing surface units either inboard or outboard on the vertical axis of the said respective struts.

2. An aircraft, a fuselage, having landing gear with water planing adaptability mounted thereon, a hydrodynamic lift control for the aircraft landing gear, said landing gear comprising strut members having a fixed portion and a rotatable end portion, said fixed portion being connected to and depending from the fuselage, an axle means carried by each strut end of the rotatable strut portion, a water planing member with a planing surface mounted on each respective axle for movement in trim, said planing surface of each planing member having an aspect ratio less than one when the longitudinal axis of the planing member is substantially parallel to the thrust line of the aircraft, said surfaces sustaining said aircraft by hydro-dynamic lifting forces with forward planing motion on a water surface, bearing means rotatably connecting said planing members to each respective rotatable strut end portion providing for lateral inboard or outboard movement, thereby changing the aspect ratio of each planing member to greater than one in proportion to the angle turned with respect to the thrust line of the aircraft, and remotely controllable ram means supported by said fixed portion of each of the respective strut means and operatively connected to said rotatable bearing means to turn said rotatable portion of the strut means and vary the angle of the longitudinal axis of each respective planing member with respect to the thrust line of the aircraft.

References Cited in the file of this patent

UNITED STATES PATENTS

| | | |
|---|---|---|
| 2,106,934 | Saulnier | Feb. 1, 1938 |
| 2,393,110 | Kops et al. | Jan. 15, 1946 |
| 2,424,233 | Greenough | July 22, 1947 |
| 2,474,630 | Jamison | June 28, 1949 |
| 2,625,350 | Ditter | Jan. 13, 1953 |

FOREIGN PATENTS

| | | |
|---|---|---|
| 737,057 | France | Sept. 27, 1932 |